Aug. 8, 1961  J. K. WOOD  2,995,327
SPRING SUPPORTS FOR PIPING
Filed July 3, 1959  3 Sheets-Sheet 1

INVENTOR
JOSEPH KAYE WOOD
BY
Curtis, Morris + Safford
ATTORNEYS

Aug. 8, 1961 J. K. WOOD 2,995,327
SPRING SUPPORTS FOR PIPING
Filed July 3, 1959 3 Sheets-Sheet 2
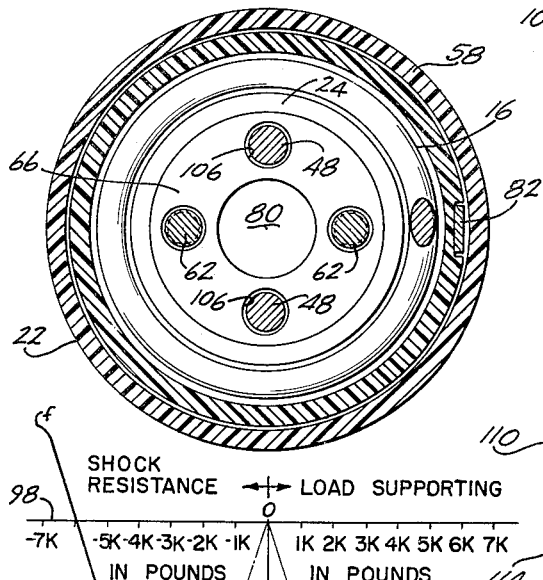
FIG. 3
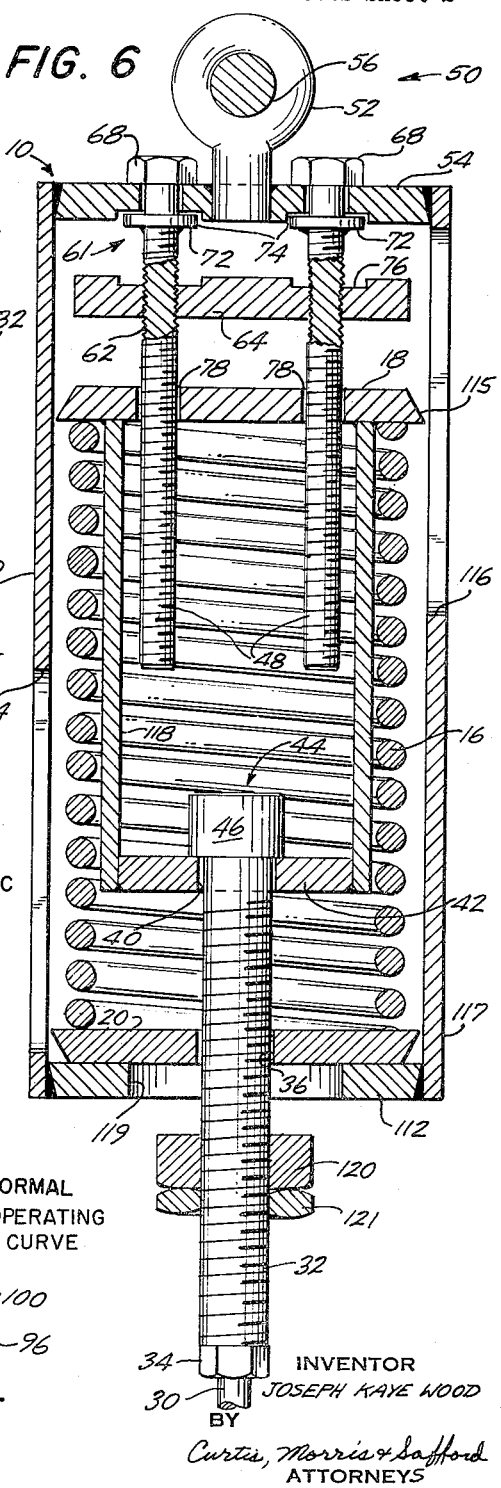
FIG. 5
FIG. 6
INVENTOR
JOSEPH KAYE WOOD
BY Curtis, Morris & Safford
ATTORNEYS United States Patent Office 2,995,327
Patented Aug. 8, 1961

2,995,327
SPRING SUPPORTS FOR PIPING
Joseph Kaye Wood, Westover Park, Stamford, Conn.
Filed July 3, 1959, Ser. No. 824,832
13 Claims. (Cl. 248—54)

This invention relates to spring supports adapted to support high temperature piping, accommodating the upward and downward movement of the piping caused by changes in operating temperatures and other factors. More particularly the present invention relates to compact axially-loaded spring supports providing for non-resonant action and shock-absorbing action, which are particularly well suited for shipboard installations or other installations wherein sudden forces may arise which tend to induce vibrations or shocks in the piping and wherein small size and light weight are of major importance. The spring itself which has a large load capacity is advantageously utilized to oppose shock movements of the supported piping, thus providing a large capacity shock-absorbing and resonant damping action without the aid of an extra spring.

Among the many advantages of the spring supports described herein as illustrative of the present invention are those resulting from their compact configuration and low headroom requirements which enable convenient piping layouts to be made in confined spaces, such as beneath decks and between bulkheads. Another advantage is the adjustability of the overall vertical height of the support to accommodate the actual supporting force which may occur when the pipe is either hot or cold depending upon whether the movement of the load is up or down. Moreover, these spring supports, while light in weight, have a high load capacity and incorporate low-cost fabrication techniques.

In addition to the many other advantages, these supports which are described herein as illustrative embodiments of the present invention are reversible in their load-supporting operation as well as in their non-resonant and shock-absorbing actions. They can be used for piping installations wherein the piping expands or moves upwardly with increases in temperature or other conditions and also for installations wherein the piping moves downwardly. The non-resonant damping action and the large shock-absorbing capacity can be arranged to operate either upwardly or downwardly, depending upon the installation requirements. Also, the extent of the shock absorbing capacity can be adjusted.

In the spring supports described herein the load from the piping is applied along the axis of the support directly in line with the axis of the spring. Any suddenly applied forces which would tend to induce large movements in the piping are opposed by the very same spring which normally supports the load. Thus, the requirement for any additional shock absorbing elements is avoided, and the large capacity of the supporting spring itself is available to oppose suddenly applied loads.

The embodiments of the invention described herein are rugged in construction and easy and economical to place in use. They include indicating mechanisms which conveniently indicate the position of the load and the weight of the load being supported at every operating position. Adjustments are provided for establishing the desired load capacity and range of travel and also for setting the point at which the shock-absorbing action takes place.

It has been proposed to accomplish some of these functions in prior spring supports, but these prior supports have required two or more springs, whereas the present invention advantageously enables all of these functions to be provided with a single axially loaded spring.

In this specification and in the accompanying drawings, are described and shown two illustrative spring supports embodying the invention and various modifications thereof are indicated, but it is to be understood that these are not intended to be exhaustive nor limiting of the invention, but on the contrary are given for purposes of illustration in order that others skilled in the art may fully understand this invention in spring supports and the manner of applying the spring supports in practical use so that they may modify and adapt them in various forms, each as may be best suited to the conditions of a particular use.

The various objects, aspects, and advantages of the present invention will be more fully understood from a consideration of the following specification in conjunction with the accompanying drawings, in which:

FIGURE 3 is a cross sectional view taken along the line 3—3 of FIGURE 1 looking downwardly;

FIGURE 5 is a plot of the operating characteristics of the supports as shown for load-supporting action and for shock-absorbing action, with the supporting force in pounds expressed universally in terms of "K," the spring constant, and with the travel of the load plotted in inches.

FIGURE 6 is an axial sectional view of another example of the present invention.

Figure 1:
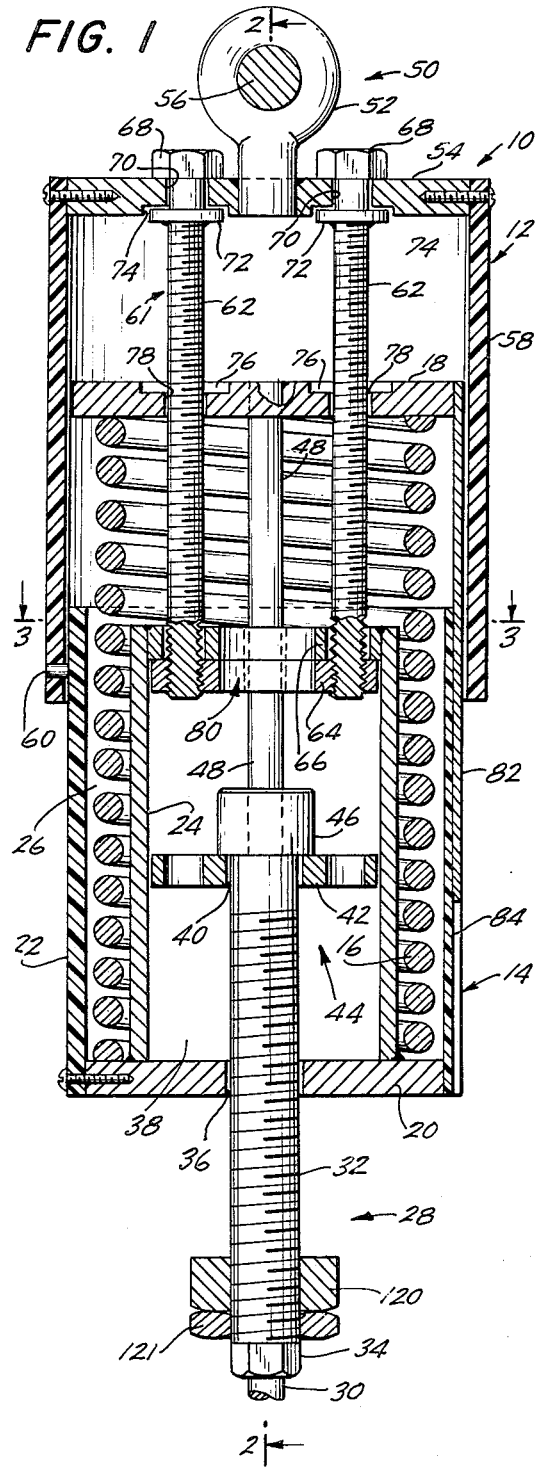
FIGURE 1 is an axial sectional view of a spring support embodying the present invention and shown in operating position.

Referring to the drawings in greater detail, the spring support shown in FIGURES 1 to 4 is illustrated in normal operating position. It has a split cylindrical protective housing generally indicated at 10 comprising a pair of telescoping portions 12 and 14. A large compression coil spring 16 is enclosed within the protective housing and is engaged between a pair of movable spring seats 18 and 20. It will be noted that the lower spring seat 20 carries the spring and forms the end of the lower telescoping cover portion 14. This cover portion 14 includes an outer cylindrical protective cover 22 fastened to the perimeter of the seat 20 and load-bearing means 24 in the form of a tube which is integrally secured to the seat 20 within the convolutions of the spring. An annular well 26 is defined by the space between the cover 22 and inner tube 24 and completely encloses and protects the lower end of the spring.

In normal operation, the upper spring seat 18 moves in an axial direction up and down within the upper housing portion 12 in response to the movement of the load as caused by changes in the operating conditions, such as changes in temperature. Also, during normal operation, the lower housing portion 14 and its spring seat 20 will remain fixed in a predetermined adjusted position.

The load, which is not shown, is understood to be installed piping and the like, and it may include valves and their operating mechanism together with thermal insulation. This load is fastened to the lower end of load connection means, generally indicated at 28, which extend from the bottom of the telescoping cover portion 14 and include a load rod 30, sometimes called the "sling rod."

To provide adjustment during installation, the upper end of this load rod 30 is threaded up into the interior of a threaded support member 32 and is held at the desired position by means of a lock nut 34. The effective length of the load connection means 28 can be adjusted as desired by screwing the rod 30 into the member 32.

In order to support the load and accommodate its movement, the load-supporting member 32 passes freely up through an opening 36 in the lower spring seat 20 and extends into a chamber 38 within the interior of the lower housing portion 14. The member 32 fits freely through a central hole 40 in a disc element 42 forming part of a force-reversing mechanism 44, which has many advantages, as explained in detail below.

The downward pull of the load is borne by a head 46 on the member 32 bearing down upon the element 42. This pull of the load is transferred up to the spring seat 18 through a pair of tension rods 48 (please see also FIGURE 2) which are secured by welding to the element 42 and to the spring seat 18.

From the foregoing description it will be appreciated that the upward thrust of the compression spring 16 on the seat 18 supports the load by pulling upwardly on the tension rods 48. This supporting force without change in direction normally acts through the force-reversing mechanism 44 including the member 32 and thus to the load rod 30.

This support is adapted to be fastened to any one of various kinds of mounting structures, depending upon the kind of installation in which it is used and its location. The mounting structure may be the framework of a building, floor beams, ceiling trusses, the bulkhead of a ship, or the underside of a deck, or the like. For fastening the spring support to the mounting structure, connection means 50 illustratively shown in the form of an eye anchor 52 extend up from a fixed frame bracket 54 which forms the top of the upper cover portion 12. As illustrated, the connection means 52 is mounted upon a fixed bar 56. The upper cover portion 12 also includes a cylindrical cover 58 secured to the perimeter of the bracket top 54 and depending therefrom in telescoping relationship with the lower cylindrical cover 22.

In order to hold the cylindrical covers 22 and 58 in the concentric relationship, three sliding bearing pins 60 are driven in through the outer cover 58 so as to fixed in position near its lower edge. These bearing pins project radially inwardly and slidingly engage the inner cover 12 near its rim.

The lower spring seat 20 is suspended from the top frame bracket 54 by means of a load adjusting mechanism 61 including a pair of adjusting screws 62 which threadedly engage an adjustable stop 64. A stop-engaging seat 66 normally rests down upon this stop and carries the tubular tension wall 24 which is secured to the perimeter of the seat 66 by welding. As illustrated, the heads 68 of these adjusting screws sit upon the upper surface of the frame bracket 54 with their shanks projecting down through holes 70. To hold these screws in place, washers 72 are welded to them and fit into clearance recesses 74. Matching recesses 76 are formed in the top of the spring seat 18 concentric with the holes 78, thus allowing the seat 18 to rise up against the frame bracket 54 in the absence of any load on the rod 30. A large central aperture 80 in the stop 64 and in the stop-engaging seat 66 provides headspace through which the head 46 can rise for absorbing shock forces as explained further below.

*Operation of the spring support of FIGURES 1 through 4*

In order to explain the operation of the spring support illustrated in FIGURES 1 through 4, it is assumed that the support will be utilized in an application wherein the change in operating conditions, such as from a "cold" (or "off") condition, to a fully "hot" (or "on") condition causes the piping to expand or move upwardly with respect to the mounting structure 56, at the particular point of support under consideration.

The first step during the installation of the support, and before either of the connection means 28 or 50 is connected to the mounting structure or to the load, is to adjust the screw mechanism 61. By using a wrench on the screw heads 68, the installation mechanic moves the stop 64 toward or away from the frame bracket 54, and this correspondingly adjusts the lower seat 20 toward or away from the bracket 54.

Because the load has not yet been imposed, it will be understood that the spring 16 will expand itself to occupy as much space as is available. Thus, the upper spring seat 18 will be raised up above the operating position shown in FIGURES 1 and 2. With no load imposed, the spring seat 18 is pressed by the spring into contact with the underside of the top bracket 54.

As the installation mechanic tightens up on the adjusting screws 62, the lower spring seat 20 is pulled up toward the bracket 54, reducing the available space within the protective housing 10 and compressing the spring between its seats 18 and 20. This adjustment is continued until the force exerted by the compressed spring against each of its seats 18 and 20 exactly equals the magnitude of the load which has been calculated as required to be supported in the top or "hot" condition.

Advantageously, the screw adjusting mechanism 61 also determines the operating length of the protective housing 10. As the spring 16 is compressed, the two cover portions 12 and 14 telescope one within the other. This reduces the over-all length of the protective housing 10 and correspondingly reduces the headroom requirements for the support, that is, the height of the space above the supported load and beneath the mounting structure 56 which is required to admit the support.

Figure 4:
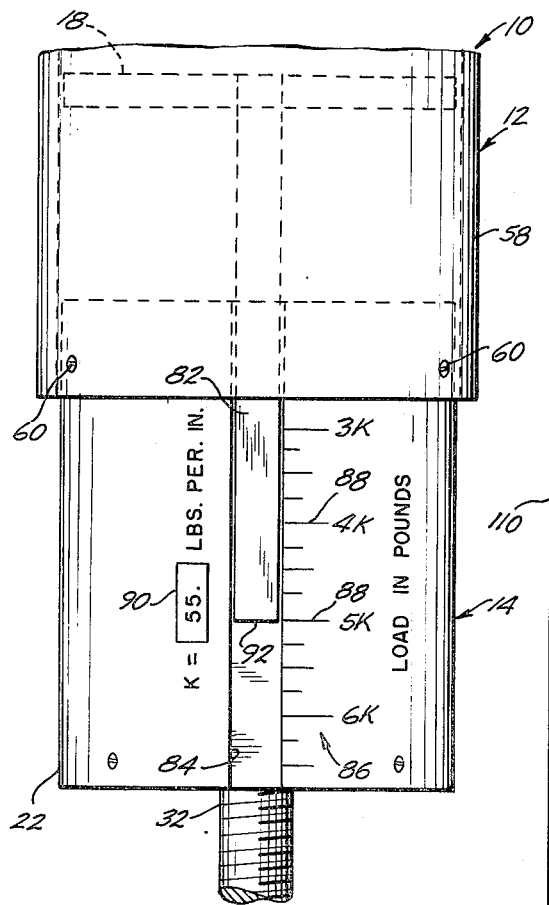
FIGURE 4 is a partial elevational view showing the housing and the indicating scale mechanism. This view corresponds in position to the view of FIGURE 2.

The force of the compressed spring which is established by the adjustment screws is conveniently read by the indicating mechanism shown in FIGURE 4. This indicating mechanism includes a pointer blade 82 secured to an edge of the top seat 18 projecting down within a grooved track 84 in one side of the cylindrical cover 22. A scale 86 extends vertically along beside the grooved track 84 and has its main graduation marks 88 each spaced one inch apart. This scale reads universally in terms of "K," the spring constant, expressed in terms of pounds per inch of deflection, and also indicates the extent of the load movement.

The advantage of expressing this scale 86 in terms of the constant K is that all of the scales on particular sizes of these supports will be identical. There is a commercial tolerance in compression springs of ±8% and sometimes more. Therefore, in assembling the hanger the particular spring 16 is tested by the spring manufacturer and its actual constant K, for example 55 pounds per inch of deflection, is printed on a plaque 90. The scale reading appears opposite the lower end 92 of the pointer blade.

As plotted in FIGURE 5, the load-deflection characteristic line 100 is seen to extend from the zero point on the vertical load-travel axis 94 down to an end point 96, which is opposite to the 7-inch index mark. The values indicated along the horizontal axis 98 are force in pounds expressed in terms of the spring constant K. To the right of the zero, the values of the load support force are shown as being positive because they represent upwardly directed supporting force applied to the load. Thus, for example, the points *a, b, c,* and *d* along the load-deflection curve 100 correspond with load-supporting forces of 3K, 4K, 5K, and 6K, respectively.

Figure 2:
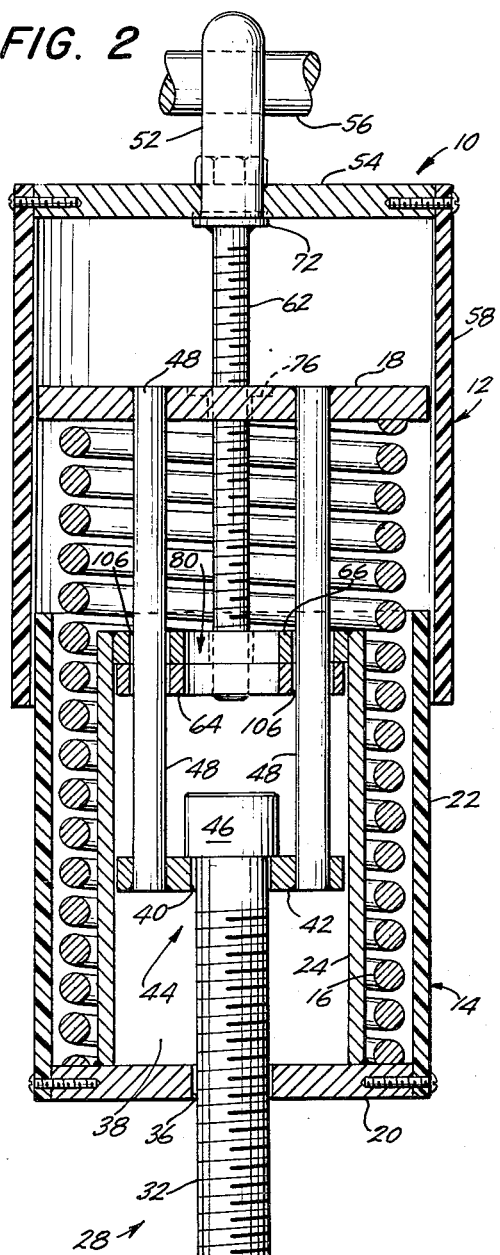
FIGURE 2 is an axial sectional view of the spring support of FIGURE 1 taken along the line 2—2 in FIGURE 1.

As shown in FIGURE 4, the load-supporting action in this embodiment of the spring support is arranged to stop at the position *a*, corresponding to a minimum force of 3K because any less does not appear to be useful for most applications. This minimum force at 3K occurs when the stop 64 is at its lowest position on the screws 62, as is illustrated in FIGURES 1 and 2. Accordingly, FIGURES 1 and 2 show the protective housing expanded to its maximum overall height. In most instances the adjusting mechanism 61 is conveniently used to shorten the height of the support to accommodate the actual required supporting force.

The values of force expressed along the horizontal axis 98 to the left of zero are shown as negative because they represent force exerted by the spring in the opposite direction from that normally applied in supporting the load, that is, the spring is absorbing shock loads by offering resistance to the movement of the load. The spring is actively pressing down on the load to resist an upwardly directed movement of the load with respect to the mounting structure 56. This downwardly directed shock-resistance force can occur when shock loads are imposed on the piping installation. For example, in an installation on a ship in a rough sea, at the instant when the hull starts plunging downwardly after a swift rise, then the piping may tend to continue rising while the hull is falling. The spring support as described will absorb this shock by applying a large downwardly directed force upon the load. This smoothly checks the tendency for the piping to rise and forces it to follow down as the hull drops. A series of load-deflection curves 101, 102, 103, and 104 are illustrated to the left of the vertical axis 94. These four curves show the operation of the support during shock-absorbing action, as the support is adjusted for various positions of operation. It is to be understood that these four curves 101–104 are all parallel to one another and are also parallel to the curve 100. These curves are examples of a whole family of such curves which are available for shock-absorbing action, depending upon the particular adjustment being used, as will be explained in detail further below.

The extreme end of all of these curves 100–105 are seen to curve away from a straight line. This occurs because, at the extreme ends of each of these curves, the coil spring has been almost completely compressed, so that the adjacent convolutions begin to touch one another. Thus, as progressively more convolutions close against each other, the spring becomes progressively stiffer, and then it reaches its fully compressed or solid-height position, such as occurs at the end point 96, for example. This additional stiffness just before the spring becomes fully compressed is always available to help in cushioning shock loads in either direction, if the need should arise.

As explained above, the first step is for the installation mechanic to turn the screws of the load-adjusting mechanism 61 until the compression force of the spring equals the calculated load to be supported in the top "hot" (or "on") position. For example, assume that this top load value is 4K pounds. Then the adjusting screws 62 are turned until the indicating pointer 92 is opposite the 4K graduation mark 88 of the scale 86. This initial adjustment will draw the stop 64 upwardly along the screws 62 by a distance of one inch and will compress the spring so that it will be set to the operating point b on the operating curve 100, which is opposite to the 4-inch position on the load travel line 94.

The second step is to secure the connection means 50 upon the mounting structure 56. A snug fit is desirable between the eye 52 and the mounting bar 56 so as to provide for the absorption of upward thrusts without any significant play in the connection means 50.

As a third step, the load rod 30 is connected to the load, while the load is cold, and the effective length of the connection means 28 is shortened until the indicating pointer 92 is moved downwardly along the scale 86 to the load-supporting force which has been calculated for the low or "cold" position of the load. In this example it is assumed that the normal travel of the load is one-inch, and thus the position c will represent the normal low position, providing a supporting force of 5K.

This application of the cold load will pull the spring seat 18 down away from the bracket 54 into an operating position similar to that shown in FIGURES 1 and 2, except that the preceding discussion has described the stop 64 as being adjusted to a position one-inch above its lowest position, as shown in FIGURES 1 and 2.

During these three steps the up-shock abutment nut 120 with its lock nut 121 is left in its inactive position at the lower end of the threaded member 32.

When the load is placed in operation, the conditions, such as temperature, become changed and the load moves upwardly from c to the top "hot" position b. The spring seat 18 is moved up adjacent to the bracket 54, and the pointer 92 moves upwardly along the scale 86. During movement of the load, the tension rods 48 slide freely up or down through the openings 106 (please see also FIGURE 3) in the stop 64 and in the stop-engaging seat 66.

While the load is in its top "hot" position b, the final adjustment is to bring the up-shock abutment nut 120 up until it just touches the bottom of the lower spring seat 20 and lock it in place by the nut 121.

In the event that a sudden down shock is imposed on the load, for example as by a ship suddenly rising up a steep wave, the reserve capacity of the spring is available to provide a large shock-absorbing force. Thus, as the load tends to pull down from its normal "on" position b, there is an additional three inches of travel available from the point b to the point 96 along the operating curve 100. A total shock-absorbing force of an amount somewhat above 7K is available.

In the event that a sudden up-shock on the load occurs, such as is imposed by a sudden downward movement of the ship following a rising movement, then the load tends to rise with respect to the mounting structure 56. As the load rises above the position b the up-shock abutment 120 strikes the spring seat 20. At this same instant the spring seat 18 also strikes the bracket 54. Immediately, the large capacity of the spring itself is available to press down upon the load.

Any further upward movement of the load is accommodated by the force-reversing over-travel mechanism 44 and lifts the stop-engaging seat 66 away from the stop 64 and immediately shifts the operating point along the shift line 107 from b over to g on the up-shock operating curve 102. This imposes a down thrust of —4K on the load tending to arrest any further movement. It will be noted that the curve 102 extends up to the point h, which represents a total available force of an amount somewhat more than —7K for absorbing any up-shocks.

Thus, advantageously, the total force of the spring is made continuously available to absorb shock loads either upwardly or downwardly, and this desirable shock-absorbing operation is obtained without the use of an additional spring.

Moreover, this support uses the spring force itself to oppose resonant vibrations. If the load should tend to resonate up and down, any upward excursions beyond the point b are immediately damped out by the favorable action of the support in providing a very abrupt knee in the operating curve at the point b and additionally, in applying a downward force as occurs along the line 102 above the point g. This desirable non-resonant operation also is obtained without the use of an additional spring as required in prior supports to form a knee in the curve. The advantages accruing from this provision of non-resonant and shock-absorbing action without requiring the use of an additional spring are more than the saving in size, weight and cost resulting from the elimination of a spring. There is also a marked improvement in the effectiveness of the non-resonant action. In this support the knee at b is very abrupt, for the curve becomes horizontal along the line 107, and then immediately there is a reversed force provided for resisting any tendency to move above the point g.

In the prior art where an additional spring is used to produce a knee in the curve, the knee is less abrupt. Also, the springs must be carefully selected in their respective characteristics so as to position the knee properly, which requires additional time and expense and complicated assembly techniques, in view of the commercial tolerances in springs.

In the foregoing discussion it was assumed that the load was of such a type that it moved upwardly in going from the "cold" or "off" condition to the "hot" or "on" condition. When dealing with applications wherein the reverse occurs, then the installation mechanic initially adjusts the mechanism 61 so that the pointer 92 is initially opposite the calculated load for the top position $b$ (which is now the "cold" or "off" condition).

The load-adjusting mechanism 61 may be called the top-position load-adjusting mechanism because it is adjusted to provide a force equal to the load at the top position regardless of whether the load moves upwardly or downwardly in going from the cold to the hot condition.

As a second step the connection means 50 are mounted, as before.

As a third step, the load rod 30 is connected to the load, and the effective length of the connection means 28 is shortened until the indicating pointer 92 just begins to move downwardly along the scale 86, revealing that the spring support is now providing a supporting force to the cold load of the proper amount, corresponding to the point $b$ on the operating curve.

At this moment, the downward pull of the load will just equal the previously adjusted compression in the spring 16, and so the pressure of the upper seat 18 against the frame bracket 54 will have been removed. The seat 18 now just barely touches the top bracket 54.

During these three steps the up-shock abutment nut 120 is left in its inactive position at the lower end of the threaded member. Now that the load is being supported at the point $b$, the abutment 120 is adjusted upwardly and locked in place so that it just touches the bottom of the lower spring seat 20. With this adjustment of the up-shock abutment 120, the support is in readiness for the supported load to be placed in operation.

When the load is placed in operation, the conditions, such as temperature, become changed and the load moves downwardly. Assuming that in normal operation the load moves down a distance of one inch, then, the low position (now called the "on" or "hot" position) is at the point $c$ on the operating curve 100, which is opposite to the 5-inch value on the vertical line 94 and represents a load-supporting force of 5K.

In case of a sudden down shock on the load, the load may tend to pull farther down from its normal "on" position $c$. There is an additional two inches of travel available from the point $c$ to the point 96 along the operating curve 100. A total shock-absorbing force of an amount up to 7K is available.

In case of a sudden up-shock on the load, the load rises along the operating curve from $c$ to $b$, and the supporting force decreases. At $b$ the up-shock abutment 120 strikes the spring seat 20. At this same instant the spring seat 18 also strikes the bracket 54. Immediately, the large capacity of the spring itself is available to press down upon the load, in the range from $g$ to $h$ along the curve 102, as before.

As another advantage of the support shown in FIGURES 1–4, it is noted that the scale 86 and pointer blade 82 correctly indicates the load-supporting force and also correctly indicates the shock-absorbing force. In effect it is a dual scale. Moreover, this scale 86 always provides a correct indication regardless of the adjustment of the top-position load-capacity adjustment mechanism 61.

During the foregoing discussion it was assumed that the load travel was one inch and the top-position load was 4K. For a top-position load of 5K and a one-inch travel, then the top-load-adjusting mechanism is set to the position $c$, and the range from $c$ to $d$ along the curve 100 is used. In this example, the shift line 109 extends over to the point $i$ on the curve 103, which has its end at $j$. It will be noted that the initial shock-absorbing force available at $i$ is now 5K, equal to the load-supporting force at the point $c$. Thus, advantageously, as the top-position load-adjusting mechanism 61 is set for larger loads, the initially applied shock-absorbing force automatically becomes larger. Moreover, the percentage variability of the supporting force is reduced as the load-supporting force is increased by means of the mechanism 61.

Any one of a whole family of available adjustments can be made with the mechanism 61. For example, the shift line 105 extends from the point $a$ over to the point $e$ on the shock-absorbing curve 101 running up to the point $f$. The shift line 111 extends from the point $d$ over to the point $k$ on the shock-absorbing curve 104 with its upper end at $l$.

Larger load travels are also readily accommodated, for example from $a$ to $c$ or from $a$ to $d$ or from $b$ to $d$ along the load-deflection line 100.

With loads which operate in the low position when the installation is "on," it is possible to advance the point at which the non-resonant damping knee action begins by screwing the nut 120 further up along the member 32 while the load is in the normal low operating position. If this is done, the nut 120 should be backed down again before the load is turned off. Accordingly it is recommended to use this procedure only when the load is expected to remain continuously in operation for a long period. For example, in the case of a load having one-inch travel with the normal low position at $c$, then advancing the point of resonant damping to the point $c$, produces the following action. Upward movement of the load in the presence of a large up shock causes the abutment 120 to engage the seat 20, the upward supporting force ceases to occur, producing an abrupt knee at $c$. However, the upper seat 18 still remains spaced a comparable distance below the frame bracket 54. Therefore, above the point $c$ the operating action shifts to the left along the shift line 109 to the intermediate point $m$, representing no applied force in the range of travel from $m$ up to $n$. Inasmuch as the spring force is suddenly removed, above the point $m$, resonant vibrations tends to be damped out by this knee action.

Any further upward movement of the load causes the operating point to rise along the ordinate line from point $m$ toward point $n$. At point $n$ the upper seat engages up against the frame 54 and the operation shifts over along the line 107 and along the dotted extension line 113 to the point $p$ on the curve 103. It will be noted that the horizontal distance from $c$ to $m$ equals the distance from $n$ to $p$. Thus, the up-shock absorbing force which becomes available above the point $p$ is now correspondingly and advantageously increased.

It will be noted that the points $e$, $g$, $i$, and $k$ fall along a straight line 104 passing through the zero point.

Among the further advantages of the support of FIGURES 1 to 4 are those arising from the fact that the protective covers 22 and 58 are unstressed parts of the support. Thus, they can be fabricated from plastic or light weight alloys because they are not required to carry the load force.

Figure 7:
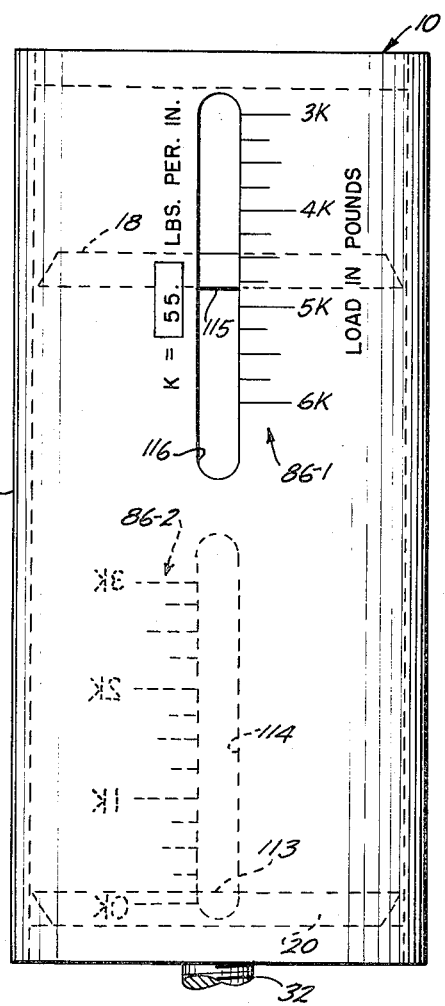
FIGURE 7 is an elevational view of the support of FIGURE 6, showing the housing and indicating scale mechanism.

In the illustrative spring support shown in FIGURES 6 and 7, parts having functions corresponding to those in the first example have corresponding reference numbers. The protective housing 10 includes a cylindrical cover 110 which is a stressed portion of the support. This cover 110 is secured to the perimeter of the frame bracket 54 and to the bottom annular stop 112 as by welding. The spring seat 20 normally bears down upon this stop 112 so as to support the pull of the load. It will be noted that the rim 117 of the seat 20 is formed with a sharp edge which acts as an index line so as to co-operate with a graduated scale 86–2 (please see FIGURE 7) extending along beside a view slot 114 in one side of the cover 110.

In order to accommodate the movement of the load, the spring seat 18 has clearance openings 78 which enable the seat 18 to move freely within the housing 10. The rim 115 of this seat 18 has a sharp edge which forms an index line to co-operate with a graduated scale 86–1 extending along beside a slot 116 in the cover 110. This slot 116 is preferably on the opposite side of the cover from the slot 114 for added strength. A tubular tension wall 118 rigidly connects the seat 18 to the element 42 of the over-travel mechanism 44.

In operation, adjustment of the mechanism 61 compresses the spring 16 to provide the desired initial load-supporting force in accordance with the procedures described above. When absorbing up shocks, the adjustable abutment 120 moves up through the clearance opening 119 and abuts against the spring seat 20.

The upper scale 86–1 in FIGURE 7 is customarily used and indicates the load force and load position in a manner similar to that of the scale 86 in FIGURE 4. The other scale 86–2 can be used to read the magnitude of upshocks, if desired.

In the foregoing description the spring supports are shown in an upright position with the pull of the load downward. This is the customary and preferred position. In certain instances the supports may be used in a horizontal, diagonal, or in completely inverted positions, depending upon the installation requirements. Accordingly, in the specification and claims the term "top" or "bottom" and "up" or "down" and the like are intended in a broad descriptive sense and are not to be interpreted as being restricted solely to vertically arranged supports. The terms "cold" and "off" are intended as synonymous, and so are 'hot" and "on."

From the foregoing it will be understood that the spring supports embodying the present invention as described above are well suited to provide the advantages set forth, and since many structural changes may be made of the various features of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. A spring support adapted to support installed piping and similar loads which are movable over a range of travel during changes in operating conditions and wherein the length of the support can be reduced to a size as determined by the requirements of the load comprising a split cylindrical protective housing having first and second end portions with first and second circular cylindrical covers secured to said first and second end portions, respectively, one of said circular cylindrical covers being of smaller diameter than the other adapted to telescope within the other, a compression spring within said housing extending partially within each end portion of said housing, and an adjusting screw mechanism carried by one end portion of the protective housing adapted to compress the spring and to draw said one cylindrical cover within the other, thereby increasing the load-supporting force and reducing the length of the support.

2. A spring support adapted to support installed piping and the like while accommodating the upward and downward movement of the piping caused by changes in operating conditions and adapted to apply the spring force to oppose forces suddenly applied in the opposite direction from the normal pull of the load, comprising generally cylindrical housing means having an axis adapted to be aligned with the pull of the supported load, a compression spring within said housing, first and second movable spring seats engaging first and second ends of said spring, respectively, first and second connection members extending from opposite ends of said housing means, one of said connection members being arranged for mounting upon a structure and the other for connection to the supported load, the force of the first end of the spring against said first spring seat normally being transferred through the support to said first connection member, an over-travel mechanism connecting said second connection member to said second spring seat, said over-travel mechanism normally applying the force of the second end of the spring against said second seat to said first connection member in a direction to support the load, and an abutment carried by said second connection member adapted to engage the opposite side of said first spring seat from the spring, whereby upon the application of large reverse forces said over-travel mechanism brings said abutment against said first movable seat, whereby the effective direction of the action of the spring is reversed so that the spring force opposes said large reverse forces so as to absorb them resiliently.

3. A spring support adapted to support installed piping and the like while accommodating the upward and downward movement of the piping caused by changes in operating conditions and adapted to utilize the spring itself to oppose forces suddenly applied in the opposite direction from the normal load, comprising housing means having an axis adapted to be aligned with the pull of the supported load, a compression spring within said housing means, top and bottom movable spring seats engaging the ends of said spring, top and bottom connection means at opposite ends of said housing means, said top connection means being arranged for mounting and the bottom connection means for connection to the supported load, the downward thrust of said spring against said bottom spring seat normally being applied through the support to said top connection means, an over-travel mechanism interconnecting said bottom connection means and said top spring seat, an adjustable abutment carried by said bottom connection means adapted to engage the lower side of said bottom spring seat, said abutment being adjustable in position with respect to said over-travel mechanism and being adjustable toward and away from the lower side of said bottom spring seat, said over-travel mechanism normally applying the force of the spring to said bottom connection means in a direction to support the load, but upon the upward movement of the load caused by large reverse forces, said abutment engaging against the lower side of said bottom spring seat, whereby the spring force opposes large reverse forces arising from the load so as to absorb them.

4. A spring support adapted to support installed piping and the like while accommodating the upward and downward movement of the piping caused by changes in operating conditions and adjustable in operation for utilizing the spring to oppose large reverse forces applied in the opposite direction from the normal load, including a support frame, a coil spring in said frame, first and second movable spring seats engaged with opposite ends of said spring, the force of the spring upon said first seat normally being carried by the frame, an over-travel mechanism normally connecting said second spring seat to the load, an abutment connected to the load and being adjustable in position toward and away from said over-travel mechanism and toward and away from said first spring seat, said abutment upon movement of the load in response to reverse forces applying said reverse forces to said first spring seat, whereby the spring force opposes large reverse forces so as to absorb them.

5. An adjustable spring support adapted to support installed piping and the like while accommodating the upward and downward movement of the piping caused by changes in operating conditions and adapted to oppose forces suddenly applied in the opposite direction from the normal pull of the load comprising generally cylindrical housing means having an axis adapted to be aligned with the pull of the supported load, a coil spring within said housing, first and second movable spring seats engaged with first and second ends of said spring, respectively, first and second connection members extending from opposite ends of said housing means, one of said connection members being arranged for mounting upon a structure and the other of said connection members being arranged for connection to the supported load, a bracket secured to said first connection member near one end of said housing means, adjusting screw means carried by said bracket, a movable stop operated by said adjusting screw means and being adjustable toward and away from said bracket for adjusting the effective length of said housing within which said spring operates, an over-travel mechanism connecting said second spring seat to said second connection member, thereby normally providing a supporting force to the load, and an adjustable abutment carried by said second connection member adapted to engage the opposite side of said first seat upon reverse movement of said second connection member in response to forces suddenly applied in the opposite direction from the normal pull of the load, said abutment being adjustable toward and away from said first seat, whereby the spring opposes the reverse movement of the second connection member for absorbing the shock of the reverse applied forces.

6. A spring support adapated to support loads movable within a range of travel due to changes in operating conditions and wherein the length of the support can be reduced to a size as determined by the actual requirements of the supported load comprising a frame member adapted to be mounted upon a structure, first and second spring seats, a compression coil spring extending between said seats and engaged therewith, first connection means arranged to connect said first spring seat to the load for supporting the load, and an adjusting screw mechanism carried by said frame member and a stop in threaded engagement with said adjusting screw mechanism and operatively associated with said second spring seat for drawing said second spring seat toward said frame member for shortening the length of said support.

7. A spring support adapted to support installed piping and the like while accommodating the upward and downward movement of the piping caused by changes in operating conditions and adapted to apply the spring to oppose forces suddenly applied in the opposite direction from the normal pull of the load, comprising generally cylindrical housing means having an axis adapted to be aligned with the pull of the supported load, a compression spring within said housing, top and bottom movable spring seats engaging the ends of said spring, top and bottom connection means at opposite ends of said housing means, said top connection means being arranged for mounting upon a structure and the bottom connection means for connection to the supported load, said bottom spring seat normally being supported from said top connection means, an over-travel mechanism connecting said bottom connection means to said top spring seat, an abutment carried by said bottom connection means adapted to engage the lower side of said bottom spring seat, said over-travel mechanism normally applying the force of the spring to said bottom connection means in a direction to support the load, but upon the application of large reverse forces, said over-travel mechanism bringing said abutment against the lower side of said bottom movable seat, whereby the spring force opposes large reverse forces arising from the load so as to absorb them resiliently.

8. A spring support adapted to support installed piping and similar loads which are movable over a range of travel during changes in operating conditions and wherein the length of the support can be reduced to a size as determined by the requirements of the load comprising a split cylindrical protective housing having a pair of end portions including circular cylindrical covers of different diameter adapted to telescope one within another, a compression spring within said housing extending partially within each cylindrical cover of said housing, a load-adjusting mechanism adapted to compress the spring and to draw one of said cylindrical covers within another, thereby increasing the load-supporting force while reducing the length of the support, a load-supporting-force indicating scale extending longitudinally along one of said cylindrical covers, a movable spring seat engaging one end of said spring and forming a movable piston within the other of said cylindrical covers, and a pointer extending from said movable seat to a position adjacent to said scale, whereby said scale reading is correctly indicated throughout the range of adjustment of said load-adjusting mechanism.

9. A spring support as claimed in claim 8 and wherein said pointer is a blade extending in a direction parallel with the axis of the spring, said cylindrical cover with the scale thereon having a longitudinal slot parallel with said scale, said pointer blade extending along said slot.

10. A spring support having a coil spring adapted to support installed piping and the like while accommodating the upward and downward movement of the piping caused by changes in operating conditions and adjustable in operation for utilizing the same spring to oppose large reverse forces applied in the opposite direction from the normal load, including a support frame, said coil spring being included in said frame, first and second movable spring seats engaged with opposite ends of said spring, the force of the spring upon said first seat normally being carried by the frame, a force-reversing mechanism normally interconnecting said second spring seat and the load, an abutment connected to the load and being adjustable in position with respect to said force-reversing mechanism, said abutment being adjustable toward and away from said first spring seat, said abutment upon movement of the load in response to reverse forces engaging said first spring seat and applying said reverse forces to said first spring seat, whereby the same spring opposes large reverse forces.

11. A spring support as claimed in claim 10 and wherein one of said spring seats has a load-supporting-force scale connected thereto and extending in a direction parallel with the axis of the spring, and an indicating element connected to the other spring seat and extending to a position near said scale for indicating said force.

12. A spring support as claimed in claim 10 and wherein one of said spring seats has a cylindrical cover portion connected thereto, a second cylindrical cover portion in said frame, said cover portions being in telescoping relationship, a scale extending longitudinally along said first cover portion, an indicating element secured to said other spring seat and extending to a position adjacent to said scale.

13. A spring support adapted to be positioned vertically for supporting installed piping and the like including a frame having a bracket at the upper end with connection means at the upper end for connection to mounting structure, a coil compression spring within said frame, upper and lower spring seats engaging the upper and lower ends of said spring, second connection means for connecting the upper spring seat to the load, an adjustable stop within said frame above said upper seat, screw adjusting means acting between said bracket and said stop for moving said stop down against said upper spring seat, said lower spring seat being movable, retaining means in the lower end of said frame engaging said lower spring seat for retaining it within the frame, a threaded rod in said second connection means, and an adjustable stop in screw engagement with said threaded rod adjustable toward and away from said lower spring seat, said adjustable stop engaging the lower surface of said lower spring seat upon upward movement of the load by a predetermined amount as determined by the adjusted position of said stop.

References Cited in the file of this patent

UNITED STATES PATENTS

| | | |
|---|---|---|
| 2,372,214 | Loepsinger | Mar. 27, 1945 |
| 2,421,822 | Wood | June 10, 1947 |
| 2,484,722 | Nickelsen | Oct. 11, 1949 |
| 2,908,491 | Suozzo | Oct. 13, 1959 |